(12) United States Patent
Krishnamachari

(10) Patent No.: US 6,721,449 B1
(45) Date of Patent: Apr. 13, 2004

(54) COLOR QUANTIZATION AND SIMILARITY MEASURE FOR CONTENT BASED IMAGE RETRIEVAL

(75) Inventor: Santhana Krishnamachari, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 816 days.

(21) Appl. No.: 09/110,613

(22) Filed: Jul. 6, 1998

(51) Int. Cl.$^7$ ................................................. G06K 9/00

(52) U.S. Cl. ..................... 382/165; 382/164; 382/305; 707/104.1

(58) Field of Search .................................. 382/165, 164, 382/305; 707/2, 3, 4, 101, 104

(56) References Cited

U.S. PATENT DOCUMENTS

| | | | |
|---|---|---|---|
| 5,751,286 A | * 5/1998 | Barber et al. ............... | 382/305 |
| 5,781,899 A | * 7/1998 | Hirata ........................ | 707/6 |
| 5,802,361 A | * 9/1998 | Wang et al. ................. | 382/305 |

FOREIGN PATENT DOCUMENTS

EP 0713186 5/1996 ........... G06F/17/30

OTHER PUBLICATIONS

Gong et al. "An image database system withcontent capturing and fast image indexing abilities" Proc. of the International Conf. on Mutimedia Computing and Systems pp. 121–130, May 1994.*

Image Processing, 1998. International Conference on, 1998, pp. 119–122 vol. 3 "Ascalable algroith for image retrieval by color" S. Krishnamachari et al.

* cited by examiner

Primary Examiner—Jingge Wu
(74) Attorney, Agent, or Firm—Gregory L. Thorne (57) ABSTRACT

The invention determines the degree of similarity between a target image and each of a plurality of reference images. The measure used for the degree of similarity between images is based on the human perceptive system, so that images that appear to a human to be similar in color have a higher similarity measure than images that appear to a human to be dissimilar in color. Each of the most populous colors of each partition of the target image is associated with a color in a corresponding partition of the reference image that is closest to the target image color. The similarity measure is based on the number of occurrences of each of these associated colors in the corresponding partitions, as well as the color difference between these associated colors. Thus, images that have similar, albeit not identical, colors, will have a higher similarity measure than images that have dissimilar colors. In a preferred embodiment, color difference is determined based upon the CIE luminance-chrorinance color space. Also, in a preferred embodiment, the target image color is quantized into a set of discrete colors that are based upon the predominant colors in the reference images.

20 Claims, 4 Drawing Sheets

COLOR QUANTIZATION AND SIMILARITY MEASURE FOR CONTENT BASED IMAGE RETRIEVAL

FIELD OF THE INVENTION

This invention relates in general to the field of computers, and in particular to image retrieval from large image databases, such as photographic archives, digital libraries, catalogs, and videos.

BACKGROUND OF THE INVENTION

Various techniques are commonly employed for retrieving images stored in a database. The most conventional technique for storing and retrieving images that match a desired characteristic is to associate key words with each image, such as "portrait", "seascape", "mountain", "presidents", etc. Having associated such key words to the images, a user provides one or more search words to the search or retrieval system, and the system presents one or more images in dependence upon the degree of correspondence between the search words and stored key words. Conventional Internet search engines are examples of such text based retrieval means.

Text based image retrieval, however, requires the categorizing of each picture by keywords, which can be a burdensome process if applied to hundreds or thousands of images; also, the individual choice of keywords limits the effectiveness of the search to the degree of correspondence between the words the categorizer used se describe the stored images, and the words the searcher uses to describe the desired image.

Graphics based retrieval is a more intuitive approach to image retrieval. Conventional graphic based retrieval systems employ various forms of color or pattern matching. A graphics based system, however, can be computationally intensive. Computer images are typically stored as an array of thousands of pixels, and the color of each of the thousands of pixels is encoded as a 24-bit red-green-blue (RGB) value. The comparison of a target image to a collection of reference images based on these thousands of 24-bit values is computationally impractical, and a pixel-by-pixel comparison may not provide a measure of similarity that correlates to the human visual system. Practical graphics based systems, therefore, characterize an image based on an abstraction of the image, and the comparisons among images are based on the abstractions. The conventional abstractions include a partitioning of the image into an array of partitions, wherein the number of partitions is substantially less than the number of pixels in the image. Comparisons among images are based on a comparison of each corresponding partition in the images, rather than a comparison of each corresponding pixel in the images.

The conventional abstractions also include a quantization of the color value into a smaller, less precise, color value. For example, a 24-bit RGB value may be quantized to one of 64 common colors, for example, the 64 colors that might be contained in a box of 64 crayons. Such an abstraction retains the substantial color qualities of the image, but uses only 6-bits per pixel, rather than 24. Using this quantization, the characteristics of a partition of an image is encoded as a histogram of the number of occurrences of pixels of each quantized color value within the partition.

A comparison of the histograms representing the colors in each partition in the images can provide for a measure of similarity between images. Histograms are, however, by their very nature, multidimensional. A comparison between two histograms is multidimensional and does not directly provide for a single valued measure of similarity. Conventional statistical methods of comparing the number of occurrences of events, based, for example on a chi-square test, can be used to compare histograms. Conventional methods used to compare histograms, however, do not take into account the sensitivities of the human perception system. For example, of the 64 quantized colors discussed above, multiple shades of green may be provided, including "ivy" and "emerald". One image may contain a substantial number of occurrences of the quantized "ivy" color, whereas another image may contain a substantial number of occurrences of the quantized "emerald" color. A conventional histogram comparator would not necessarily determine a similarity between these images, because they contain "different" colors. Reducing the number of quantization levels, for example to the six primary colors plus black and white, eliminates this problem by quantizing all shades of green to the same "green" value. Such a reduction, however, will preclude an ability to identify a stronger similarity between images that do, in fact, have corresponding shades of color, such as "ivy" or "emerald".

The conventional method of quantizing colors also uses an a priori determination of the quantization levels. Choosing the 64 colors of a common box of crayons may provide for an effective quantization scheme for images in general, but it may not be suitable for all database collections. For example, if the image database is a database of portraits, having multiple shades of green or violet colors would not provide the same distinguishing capabilities as having varying shades of hair and flesh colors.

Therefore, a need exists for a method and apparatus that provides a similarity measure between images that is based on the human perceptive system. A need also exists for a method and apparatus that provides for a comparison between images that is based on the expected color content of the images.

DETAILED DESCRIPTION OF THE PREFERRED EMBODIMENT

In general, the invention provides for a method and apparatus for determining a degree of similarity between a target image and each of a plurality of reference images. The measure used for the degree of similarity between images is based on the human perceptive system, so that images that appear to a human to be similar in color have a higher similarity measure than images that appear to a human to be dissimilar in color. Each of the most populous colors of each partition of the target image is associated with a color in a corresponding partition of the reference image that is closest to the target image color. The similarity measure is based on the number of occurrences of each of these associated colors in the corresponding partitions, as well as the color difference between these associated colors. Thus, images that have similar, albeit not identical, colors, will have a higher similarity measure than images that have dissimilar colors. In a preferred embodiment, color difference is determined based upon the CIE luminance-chrominance color space. Also, in a preferred embodiment, the target image color is quantized into a set of discrete colors that are based upon the predominant colors in the reference images.

Figure 1:
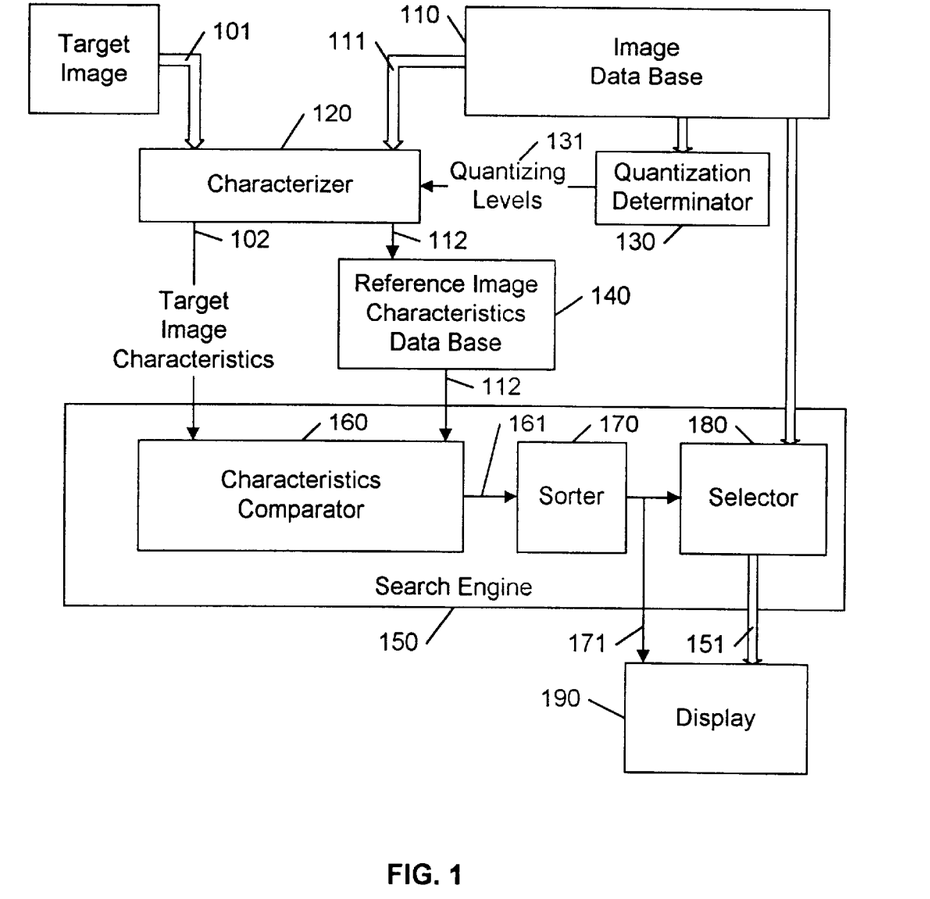
FIG. 1 illustrates an example block diagram of an image comparison system in accordance with this invention.

FIG. 1 illustrates an example image comparison system in accordance with this invention. The image comparison system of FIG. 1 includes a characterizer 120 that characterizes images 101, 111 into image characteristics 102, 112, and a search engine 150 that locates a subset 151 of the images 111 that are similar to image 101, based upon the image characteristics 102, 112. As shown in FIG. 1, reference images 111 are located in a reference image database 110. This database may be a collection of bitmaps, JPEG images, MPEG videos, and the like. As is common in the art, the database may be local or remote, unified or distributed, homogeneous or non-homogeneous. For example, the database may be an encoding of all the portraits in a particular museum that is stored at the museum's web site on the world-wide-web. Or, it may be all the works of artists of a certain period, stored at multiple sites on the world-wide-web. Or, it may be a particular user's collection of images of automobiles, stored on disks at the user's site.

In operation, a user of the image comparison system of FIG. 1 provides a target image 101 to the system, and the system thereafter provides a list 171 of those images 111 in the database 110 that are most similar to the target image 101. The characterizer 120 characterizes the target image 101 into target image characteristics 102. The characterizer 120 also characterizes each reference image 111 into reference image characteristics 112, for comparison with the target image characteristics 102. For efficiency, the reference images 111 in the reference image database 110 are characterized by the characterizer 120 once, and stored in a reference image characteristics database 140. In this manner, alternative target images 101 can be submitted for characterizing and searching without requiring all the reference images 111 of the reference image database to be characterized again.

The search engine 150 includes a characteristics comparator 160 that compares the target image characteristics 102 with each reference image characteristics 112 from the reference image characteristics database 140 and produces a similarity measure 161 for each reference image characteristics 112. Associated with each reference image characteristics 112 is an identifier to its corresponding reference image 111 in the reference image database 110. The sorter 170 sorts the identifiers to the reference images 111, based on the similarity measure 161, and provides a sorted list of identifiers 171 to a display 190. Alternative, the sorted list is provided to a selector 180 that selects the images 111 corresponding to the list of identifiers 171, and provides a sorted subset 151 of the images 111 to the display 190. That is, the user will be provided a list or display of the images 111 in the database 110 that are most similar to the target image 101.

Also illustrated in FIG. 1 is an optional quantization determinator 130. In a preferred embodiment of this invention, the color quantization levels 131 are determined based upon one or more representative images in the reference image database 110. The colors of the representative images are used to determine a set of color centers, each color center being a centroid of a subset of the colors that are within the representative images. Any number of techniques may be used to determine an appropriate set of color centers. For example, if 64 quantization levels are desired, the 64 color centers could be defined as the colors of the 64 most populous pixel colors in the representative images. In the quantization process, a pixel's quantized value will be the value of its nearest color center. The difference between a pixel's actual value and the pixel's quantized value is termed a quantization error. To further refine the choice of color centers, the color centers can be determined as the 64 pixel colors that result in a minimum overall quantization error, using for example, least squares minimization techniques common in the art. By determining color centers that are based on the actual color values that are contained in the representative images, the color resolution of the characterization process in the characterizer 120 is thereby dynamically adjusted to distinguish among shades of the prevalent colors in the representative images. For example, if the representative images contain many brown regions, and few green regions, more color centers will be associated with shades of brown than with shades of green. Thereafter, a finer distinction of shades of brown will be used by the characterizer 120 to characterize the target image 101 and the reference images 111, and reference images 111 having similar shades of brown to the target image 101 will have a higher similarity measure 161 than reference images 111 having dissimilar shades of brown. Conversely, a reference image 111 having a different shade of green from te target image 101 may produce the same similarity measure 161 as another reference image 111 that has the exact shade of green as the target image 101, because there may be only one color center associated with all shades of green.

A preferred embodiment of this invention utilizes a color encoding that provides a characterization that reflects the human visual perception system. That is, the encoding is such that colors that appear to be similar in the human visual system have a small color difference, or distance, between them in this encoding, and colors that appear to be dissimilar to the human visual system have a large color difference. The Euclidean distance between two colors in the conventional RGB encoding space does not truly reflect the difference perceived by the human visual system. The Commission Internationale de l'Eclairage (CIE) has recommended two color space encodings that have a high correlation to the perceptions of the human visual system: CIELUV and CIELAB. In the preferred embodiment, the CIELUV encoding, which uses a measure of luminance (L) and two measures of chrominance (U, V) of the image, is used. The translation from one color space to another is known to one of ordinary skill in the art, as are the means of converting from various image encoding formats, such as JPEG, MPEG, NTSC, PAL, and the like. If the encoding of the target image or an image in the data base does not reflect the perceived differences between colors in the human visual system, the characterizer 120 and quantization determninator 130 include the appropriate translation means to encode the image into an encoding that has a high correlation to the human visual system.

Figure 2:
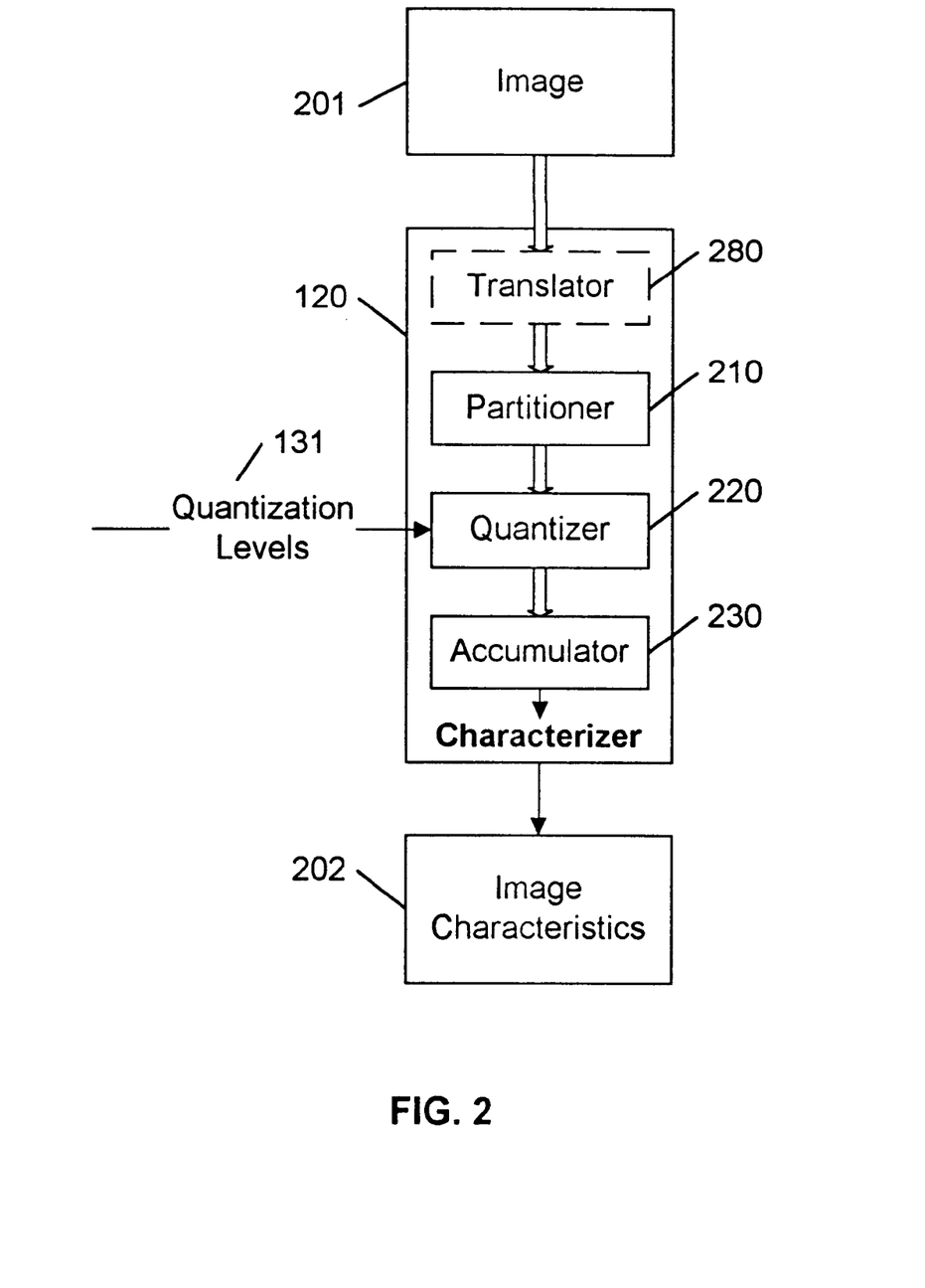
FIG. 2 illustrates an example block diagram of a characterizer to facilitate the characterization of an image in accordance with this invention.

FIG. 2 illustrates an example block diagram of the characterizer 140 that characterizes an image 201 to produce an image characteristic 202. The characterizer 140 includes a partitioner 210, a quantizer 220, and an accumulator 230. The characterizer 140 also includes an optional translator 280 for translating the encoding of the image as discussed above. The partitioner 210 partitions the image into an array of partitions. The number of partitions is somewhat subjective. The level of detail of the image characteristics 202 will be dependent upon the number of partitions. A large number of partitions provides for a high level of detail in the characteristics and subsequent comparison processes, but at the cost of processing time. It may also result in erroneous similarity determinations, when, for example, the images are dissimilar at a fine level of detail, but similar at a gross level of detail. Alternatively, a small number of partitions will consume less processing time, but may result in large numbers of reference images producing similar similarity measures 161, obviating the intended purpose of the image comparison system of separating the similar from the dissimilar. In a preferred embodiment, the image is partitioned into an array of 4×4, 8×8, or 16×16 partitions.

The quantizer 220 determines the color center, or quantization level 131 that is closest to each pixel's image color. In this manner, the range of possible colors is reduced from the full range of image color encodings to the range of quantized colors. Based on this reduced range of quantized colors, the accumulator 230 determines the number of occurrences of each of the quantized colors within each partition of the image 201. In a preferred embodiment, the accumulator 230 provides a normalized histogram of the proportion of occurrences of each quantized color in each partition.

Each reference image 111 of the reference image database 110 is processed by the characterizer 120 to produce the reference image characteristics 112 representing the proportion of occurrences of each quantized color in each partition of the reference image 111. This same characterization is used to characterize the target image 101 to produce the target image characteristics 102, and thereafter the comparison of the target image to the reference images is effected by the comparison of the proportion of occurrences of the quantized colors in each of the images.

Figure 3:
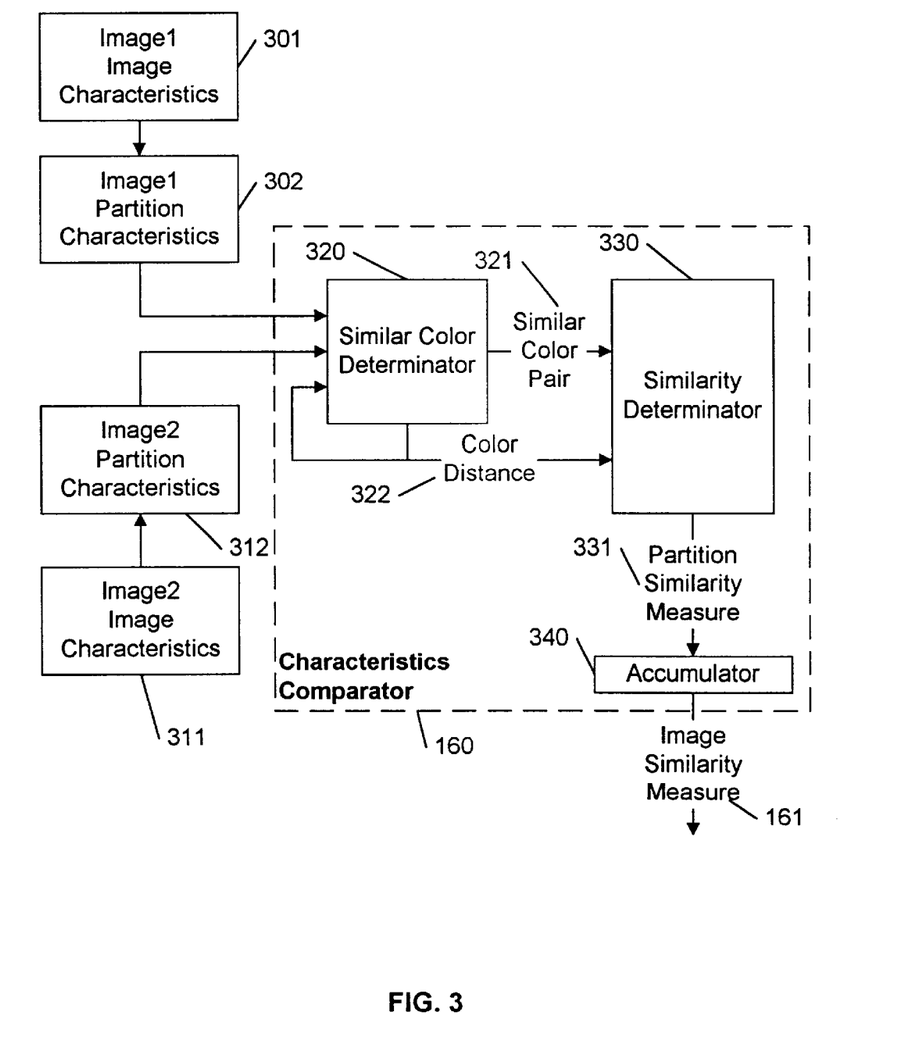
FIG. 3 illustrates an example block diagram of a characteristics comparator to facilitate the comparison of images in accordance with this invention.

FIG. 3 illustrates a block diagram of an example characteristics comparator 160 to facilitate the comparison of proportions of occurrences of quantized colors between two images, Image1 and Image2. The characteristics comparator 160 includes a similar color determinator 320, a similarity determinator 330, and an accumulator 340. The characteristic comparator compares each partition 302 of Image1 301 with a corresponding partition 312 of Image2 311. A predetermined number D of the quantized colors having the highest proportion of occurrences are used for determining color similarity between the two partitions 302, 312. In a typical embodiment, D is between 4 and 16. Each of the D quantized colors of partition 302 is matched with one of D quantized colors of partition 312. The similar color determiriator 320 determines the color distance 322 between each quantized color of partition 302 and each of the quantized colors of partition 312. The closest quantized color of partition 312 is paired with the quantized color of partition 302 under consideration. This similarity pairing is communicated to the similarity determinator 330 as a similar color pair 321. The similar color pair 321 includes the proportions of the corresponding quantized paired colors in each partition 302, 312. The corresponding color distance 322 between each of the quantized colors of the color pair 321 is also communicated to the similarity determinator 330, to avoid having to recompute the color distance.

The similarity determinator 330 computes a partition similarity measure 331 that is a composite of a comparison of the proportion of the quantized colors in each similar color pair 321, as well as the degree to which the quantized colors are similar, based on the color distance 322. In a preferred embodiment, the measure used for the comparison is directly proportional to the sum of the proportions of the paired colors, and inversely proportional to the difference between the proportions of the paired colors and inversely proportional to the difference between the color values of the paired colors. That is, the similarity measure 331 is based on the number of occurrences of similar colors in each image, and weighted by the degree of similarity between the similar colors. Consider, for example, an image that is similar to another in content, but contains different colors, for example photographs of a seascape at different times of the day. The images will exhibit a high correlation between the number of occurrences of similar colors, and will produce a high sum of proportions and a low difference of proportions, and therefore a high similarity measure based on proportions of similar colors. The overall similarity measure will be attenuated by the difference between the shades of similar colors produced by the differing times of day, as would be consistent with a human's assessment of the similarity of such photographs of a seascapes.

The accumulator 340 accumulates the similarity measure 331 of each partition of the images to provide the image similarity measure 161. If Image1 is the target image, and Image2 is a sequence of reference images, the resultant sequence of image similarity measures 161 provide for a measure of similarity between the target image and each of the reference images. This sequence of similarity measures 161, and an identifier to the reference image associated with each similarity measure 161, are provided to the sorter 170 that displays a list of the images that are most similar to the target image.

It should be noted that the aforementioned image comparison technique is not necessarily commutative, in that a different similarity measure may result, depending upon which of the two images are used as Image1 and Image2 respectively. At option, to provide for mathematical consistency and symmetry, the assignment of the target image or reference image to Image1 or Image2 is dynamic for each partition. The partition that is provided to the characteristics comparator 160 as Image1 is the partition that has the highest cumulative proportions of the D quantized colors. That is, for example, if the D most populous quantized colors of the partition of the target image account for 90 percent of the colors in the partition, and the D most populous quantized colors of the partition of the reference image account for 85 percent of the colors in the partition, the partition of the target image is provided to the characteristics comparator 160 as Image1. If the cumulative proportions of the D quantized colors in both the target and reference images are equal, the partition similarity measure 331 is computed twice, the target and reference partitions being interchanged, and the higher similarity measure 331 of the two is provided to the accumulator 340.

Figure 4:
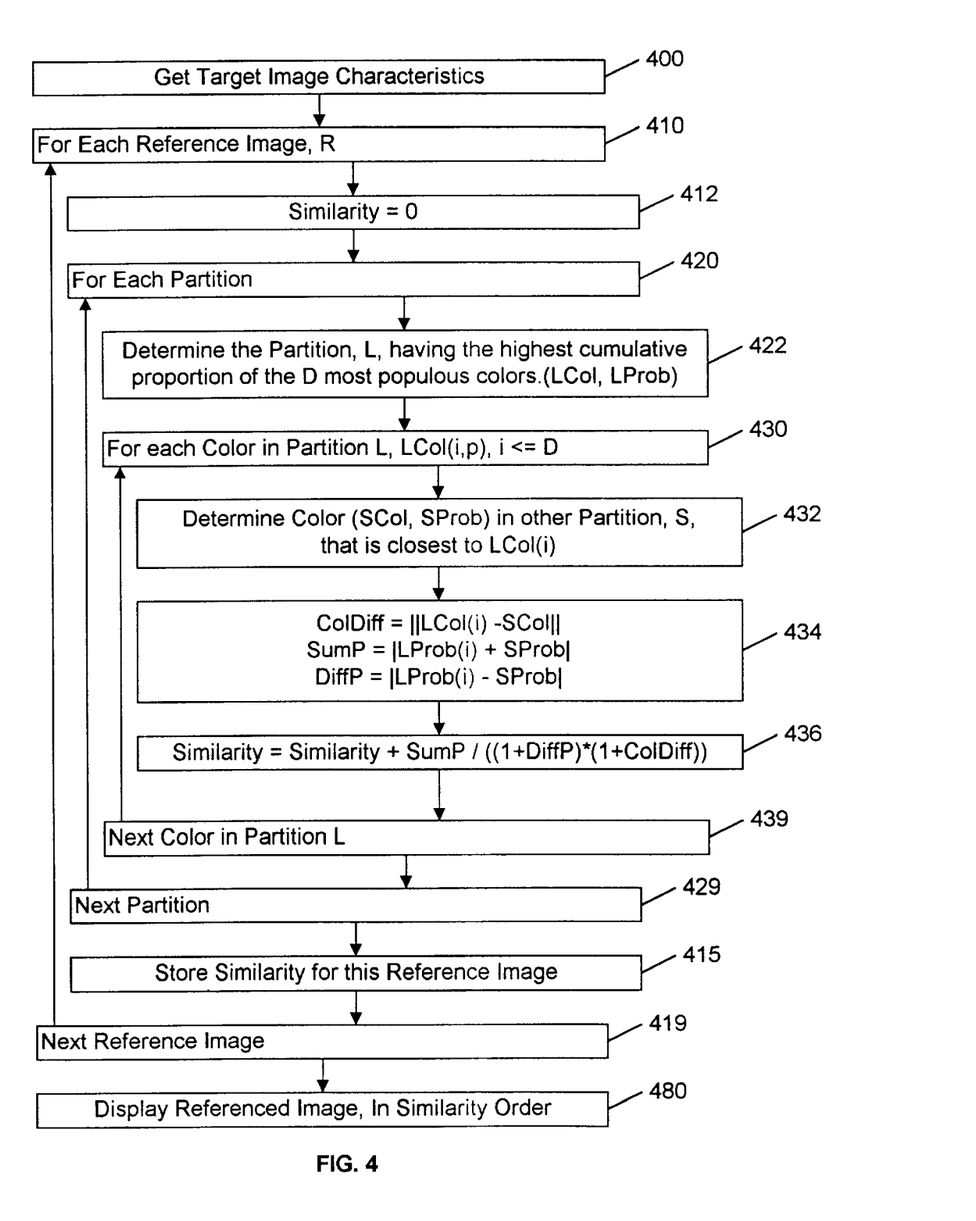
FIG. 4 illustrates an example flowchart for comparing image characteristics in accordance with this invention.

FIG. 4 illustrates an example flowchart for comparing image characteristics, as may be implemented in a characteristics comparator 160 in accordance with this invention. The characteristics of the target image are determined at 400. The characteristics of each reference image are compared to the target image characteristics in the loop 410–419. The similarity measure associated with each image comparison is initialize to zero, at 412. Each partition within each reference image is compared to a corresponding partition of the target image in the loop 420–429. At 422, the partition that has the highest cumulative proportion of the D most populous quantized colors in the partition is determined, as discussed above. For convenience, the target or reference partition that is determined at 422 to have the highest cumulative proportions is termed the large partition, L, and the remaining reference or target partition is termed the small partition S. For each of the D colors in the large partition L, a comparison is made to the most similar color in the small partition S in the loop 430–439. The color in the small partition S that is closest to the color in the large partition L is defined to be the most similar color to the color in the large partition L. This most similar color is determined at 432. The similarity measure resulting from this determination is computed at 434–436. At 434, the difference between the color in the large partition L and the most similar color in the small partition S is computed as ColDiff. The double-bar symbol "‖" is used to indicate that the computation of the difference between colors is not necessarily an arithmetic subtraction, because the color is encoded as a multidimensional value, for example, a value composed of luminance and chrominance component values, as in a CIELUV encoding. The method of computing a difference between colors is determined by the color encoding method selected, and known to one of ordinary skill in the art. Also at 434, the sum and the difference of the proportions of the color in the large partition L and the most similar color in the small partition S is computed as SumP and DiffP, respectively. At 436, the similarity measure associated with the color in the large partition L and the most similar color in the small partition S is computed as SumP divided by an offset sum of DiffP and CotDiff. The similarity measure of each of the D colors is accumulated at 436. After accumulating the similarity measure of each color in each partition of the image, the accumulated similarity measure for the reference image is stored, at 415, and the next reference image is similarly processed 410–419. After determining the similarity of each reference image to the target image, the reference images that have the highest similarity to the target image are displayed to the user, at 480.

The foregoing merely illustrates the principles of the invention. It will thus be appreciated that those skilled in the art will be able to devise various arrangements that, although not explicitly described or shown herein, embody the principles of the invention and are thus within its spirit and scope. For example, the equations shown at 434 and 436 of FIG. 4 may be modified to provide a different weighting between the effect that each factor (color distribution and color difference) has on the resultant similarity measure. For example, both the sum and the difference between the proportions of the target and reference image are computed in the preferred embodiment, although a similarity measure can be determined based on either the sum or the difference, or based on other comparative measures common in the art, such as ratios and the like, and need not expressly use proportions. Similarly, one of ordinary skill in the art may choose not to expressly attenuate the similarity measure by the color difference ColDiff 332, because the color difference can be seen to have an indirect effect on the similarity measure, via its use in the determination of which color is similar to another. Additionally, although the computation of a color difference is shown expressly as a difference computation at 434, such a computation may be effected by a table look-up or other technique common in the art to save computation time. Similarly, the particular segregation of functions presented in this disclosure represent example structures and alternative structures that embody the principles of this invention would be evident to one of ordinary skill in the art.

I claim:

1. A method for comparing a first image to a second image comprising the steps of:

partitioning the first image into a first plurality of partitions and the second image into a second plurality of partitions, each partition of the first plurality of partitions having a corresponding partition of the second plurality of partitions, determining proportions of colors in each of the partition of the first plurality of partitions and the second plurality of partitions, determining a color distance between similar colors in each corresponding partition of the first and second pluralities of partitions, comparing the proportions of the similar colors in each of the partition of the first plurality of partitions and the second plurality of partitions, determining a shape-independent similarity measure between the first image and the second image that is based on the proportions of similar colors and the color distance.

2. The method of claim 1, wherein the step of comparing the proportions of similar colors includes the steps of:

determining a sum of the proportions of similar colors in each corresponding partition of the first and second pluralities of partitions, determining a difference of the proportions of similar colors in each corresponding partition of the first and second pluralities of partitions, and determining a similarity factor that is based on the sum and the difference of the proportions of similar colors.

3. The method of claim 1, wherein the step of determining the proportions of colors in each of the partition of the first plurality of partitions and the second plurality of partitions includes:

quantizing a set of image color values within each partition to create a set of quantized color values, and creating a histogram of occurrences of each quantized color value of the set of quantized color values, wherein the proportions of colors are based on the occurrences of the quantized color values of the set of quantized color values.

4. The method of claim 3, wherein the step of quantizing the set of image colors includes the steps of:

determining a set of color centers based on an observed proportion of image colors in at least one representative image, and determining each quantized color value of the set of quantized color values to be equal to a color center of the set of color centers that is closest to the corresponding each image color value of the set of image color values.

5. The method of claim 1, wherein the color distance is based on at least one of: a luminance component, a chrominance component, and a red-green-blue component.

6. The method of claim 1, wherein comparing the proportions of similar colors in each corresponding partition of the first and the second pluralities of partitions, includes the steps of:

selecting a first image partition and a second image partition from corresponding each partitions of the first and the second plurality of partitions based on a cumulative proportion of colors in the corresponding each partitions of the first and the second plurality of partitions, determining an each second color in the second image partition corresponding to an each first color in the first image partition, based on the color distance between the each first color and the each second color, the each of the corresponding first and second colors forming an each similar color pair of a plurality of color pairs, and, comparing the proportions of each color of the each similar color pair.

7. An image comparison system for comparing a target image to a plurality of reference images comprising:
an image characterizer that characterizes the target image and each of the plurality of reference images into target image characteristics and a plurality of reference image characteristics respectively; and,
a characteristics comparator, that compares the target image characteristics to each of the plurality of reference image characteristics to produce a plurality of shape-independent similarity measures corresponding to each of the plurality of reference images;
wherein each of the plurality of shape-independent similarity measures is determined by:
proportions of colors in the target image characteristics,
proportions of colors in each of the plurality of reference image characteristics that are similar to the colors in the target image characteristics, and,
differences of the colors in each of the plurality of reference image characteristics that are similar to the colors of the target image characteristics.

8. The image comparison system of claim 7, wherein the characteristics comparator includes:
a similar color determnninator that determines an each similar color of a plurality of similar colors in a second partition of at least one of the target image characteristics and the reference image characteristics, each similar color corresponding to an each color of a plurality of the colors in the first partition based on a color distance between the each color of the plurality of the colors in the first partition and the plurality of the similar colors in the second partition;
a similarity determinator, operably coupled to the similar color determinator, that produces a partition similarity measure based on the proportions of the colors in the first partition and proportions of the similar colors in the second partition; and,
an accumulator, operably coupled to the similarity determinator, that receives the partition similarity measure corresponding to an each partition of a plurality of partitions of each of the reference image characteristics and determines therefrom each of the plurality of similarity measures.

9. The image comparison system of claim 8, wherein the partition similarity measure is also expressly based on the color distance between the each color of the plurality of the colors in the first partition and the corresponding similar colors in the second partition.

10. The image comparison system of claim 7, further including:
a sorter, operably coupled to the characteristics comparator, that provides a sorted list of the plurality of reference images based on the plurality of similarity measures, and,
a selector, operably coupled to the sorter, that selects at least one of the plurality of reference images for rendering on a display based on the sorted list.

11. The image comparison system of claim 7, wherein the image characterizer includes a translator that translates at least one of the target image and the plurality of reference images into a color encoding that corresponds to the human visual system.

12. The image comparison system of claim 11, wherein the color encoding includes a luminance value and a chrominance value.

13. The image comparison system of claim 7, wherein the image characterizer includes:
a quantizer that quantizes each of a plurality of image colors in the target image and each of the plurality of reference images into an each quantized color of a set of quantizing levels, and,
an accumulator, operably coupled to the quantizer, that accumulates a number of occurrences of the each quantized color corresponding to the each of a plurality of image colors and produces therefrom the proportions of colors in the target image characteristics and the proportions of colors in the each of the plurality of reference images.

14. The image comparison system of claim 13, further including a quantization determinator that determines the set of quantizing levels based on at least one of the plurality of reference images.

15. A search engine for finding at least one reference image in a data base of a plurality of reference images that is similar to a target image, the search engine comprising:
a characteristics comparator that compares target image characteristics corresponding to the target image to each of a plurality of reference image characteristics corresponding to each of the plurality of reference images and provides a plurality of shape-independent similarity measures corresponding the plurality of reference images, and,
a sorter, operably coupled to the characteristics comparator, that determines the at least one reference image in the data base that is most similar to the target image, based on the plurality of shape-independent similarity measures,
wherein each of the plurality of shape-independent similarity measures is determined by:
proportions of colors in the target image characteristics,
proportions of colors in the each of the plurality of reference image characteristics that are similar to the colors in the target image characteristics, and,
differences of the colors in the each of the plurality of reference image characteristics that are similar to the colors of the target image characteristics.

16. The search engine of claim 15, wherein the characteristics comparator includes:
a similar color determnninator that determines an each similar color of a plurality of similar colors in a second partition of at least one of the target image characteristics and the reference image characteristics, each similar color corresponding to an each color of a plurality of the colors in the first partition based on a color distance between the each color of the plurality of the colors in the first partition and the plurality of the similar colors in the second partition;
a similarity determinator, operably coupled to the similar color determinator, that produces a partition similarity measure based on the proportions of the colors in the first partition and proportions of the similar colors in the second partition; and,
an accumulator, operably coupled to the similarity determinator, that receives the partition similarity measure corresponding to an each partition of a plurality of partitions of each of the reference image characteristics and determines therefrom each of the plurality of similarity measures.

17. The search engine of claim 16, wherein the partition similarity measure is also expressly based on the color distance between the each color of the plurality of the colors in the first partition and the corresponding similar colors in the second partition.

18. The search engine of claim 15, wherein the target image characteristics and each of the plurality of reference image characteristics is based upon a color encoding that is correlated to human color perception.

19. The search engine of claim 15, wherein the color differences are based on luminance values and chrominance values in the target image characteristics and each of the plurality of reference image characteristics.

20. The search engine of claim 15, further including a selector, operably coupled to the sorter, that selects the least one of the plurality of reference images in the data base that is most similar to the target image and renders it on a display.

* * * * *